(12) United States Patent
Lu et al.

(10) Patent No.: US 9,646,189 B2
(45) Date of Patent: May 9, 2017

(54) SCANNER WITH ILLUMINATION SYSTEM

(71) Applicant: Honeywell International, Inc., Morristown, NJ (US)

(72) Inventors: Jun Lu, Jiangsu (CN); Jie Ren, Jiangsu (CN); Zhuling Wang, Jiangsu (CN)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 14/872,657

(22) Filed: Oct. 1, 2015

(65) Prior Publication Data

US 2016/0125216 A1 May 5, 2016

(30) Foreign Application Priority Data

Oct. 31, 2014 (CN) ............... 2014 2 0641034 U

(51) Int. Cl.
*G06K 7/10* (2006.01)
*G08C 21/00* (2006.01)

(52) U.S. Cl.
CPC ..... *G06K 7/10742* (2013.01); *G06K 7/10732* (2013.01)

(58) Field of Classification Search
USPC .............. 235/454, 455, 462.01–472.03
See application file for complete search history.

(56) References Cited

U.S. PATENT DOCUMENTS

| | | | |
|---|---|---|---|
| 6,557,764 B1 * | 5/2003 | Reasoner | G06K 7/10584 235/455 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |

(Continued)

FOREIGN PATENT DOCUMENTS

| | | |
|---|---|---|
| CN | 204256748 U | 4/2015 |
| WO | 2013163789 A1 | 11/2013 |

(Continued)

OTHER PUBLICATIONS

U.S. Appl. No. 14/519,179 for Dimensioning System With Multipath Interference Mitigation filed Oct. 21, 2014 (Thuries et al.); 30 pages.

(Continued)

*Primary Examiner* — Tuyen K Vo
(74) *Attorney, Agent, or Firm* — Additon, Higgins & Pendleton, P.A.

(57) ABSTRACT

The present disclosure relates to a scanner with an illumination system, including: a plurality of illumination devices in the illumination system, wherein the plurality of illumination devices illuminate a label; an imager, which captures an image signal reflected from the label and decodes the image signal; and a detector, which detects the intensity of light reflected from the label, wherein if the light intensity is higher than a predetermined threshold, an illumination status of one or more of the plurality of illumination devices is changed. The scanner with an illumination system according to the present disclosure can effectively avoid specular reflection when scanning a barcode on a smartphone screen.

20 Claims, 5 Drawing Sheets

(56) References Cited

U.S. PATENT DOCUMENTS

| | | | |
|---|---|---|---|
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,714,455 B2 * | 5/2014 | Matsuda | H05B 33/0803 235/462.01 |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,820,643 B1 * | 9/2014 | Lei | G06K 7/10732 235/462.06 |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,857,720 B1 * | 10/2014 | Lei | G06K 7/10742 235/462.42 |
| 8,864,034 B1 * | 10/2014 | Lei | G06K 7/10742 235/462.06 |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |
| 8,918,564 B2 | 12/2014 | Caballero | |
| 8,925,818 B2 | 1/2015 | Kosecki et al. | |

(56) References Cited

U.S. PATENT DOCUMENTS

| | | |
|---|---|---|
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2002/0070278 A1* | 6/2002 | Hung ............ G06K 7/10702 235/472.01 |
| 2007/0063048 A1 | 3/2007 | Havens et al. |
| 2007/0215706 A1 | 9/2007 | Kotlarsky et al. |
| 2008/0017717 A1* | 1/2008 | Miyazaki ......... G06K 7/10574 235/472.01 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0068629 A1* | 3/2012 | Matsuda ............ H05B 33/0803 315/313 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0211567 A1* | 8/2012 | Herzig ............ G06K 19/06065 235/488 |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Arnouse |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |

(56) References Cited

U.S. PATENT DOCUMENTS

| | | |
|---|---|---|
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Directing an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 14/340,627 for an Axially Reinforced Flexible Scan Element, filed Jul. 25, 2014 (Reublinger et al.); 41 pages.

U.S. Appl. No. 14/676,327 for Device Management Proxy for Secure Devices filed Apr. 1, 2015 (Yeakley et al.); 50 pages.

U.S. Appl. No. 14/257,364 for Docking System and Method Using Near Field Communication filed Apr. 21, 2014 (Showering); 31 pages.

U.S. Appl. No. 14/327,827 for a Mobile-Phone Adapter for Electronic Transactions, filed Jul. 10, 2014 (Hejl); 25 pages.

U.S. Appl. No. 14/334,934 for a System and Method for Indicia Verification, filed Jul. 18, 2014 (Hejl); 38 pages.

U.S. Appl. No. 29/530,600 for Cyclone filed Jun. 18, 2015 (Vargo et al); 16 pages.

(56) References Cited

OTHER PUBLICATIONS

U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
European Search Report in related EP Application No. 15191994.1, Dated Mar. 22, 2016, 7 pages.

\* cited by examiner

SCANNER WITH ILLUMINATION SYSTEM

CROSS-REFERENCE TO RELATED APPLICATION

The present application claims the benefit of Chinese Utility Model Application No. 201420641034.4 titled Scanner with lighting system filed on Oct. 31, 2014, which is hereby incorporated by reference in its entirety.

TECHNICAL FIELD

The present disclosure generally relates to the technical field of automatic recognition, and more particularly to a scanner with an illumination system.

BACKGROUND

Scanners are an instrument used for a commercial POS system, and comprise two main types: common scanners and commercial scanners. With the emergence of barcode technology, the use of labels, such as barcodes, in market circulation is a general trend. Under such a background, barcode scanners are widely used.

Common interface types of barcode scanners are SCSI (small computer standard interface), EPP (enhanced parallel port), USB (universal serial bus interface) and PS2 (keyboard interface), which can thus easily interconnect with a computer. In commercial applications, according to different working principles, barcode scanners are mainly classified into laser scanners and imaging scanners, and according to different usage methods, can further be classified into handheld barcode scanners, desktop scanners and embedded scanners, etc. In various scanners, scanners with great portability develop rapidly because of their characteristics, such as small size and convenient operation. In recent years, a variety of portable scanners with new concepts have appeared on the market, and the scanning effects thereof are outstanding, and the scanning speed is fast, thereby being welcomed by many users.

A slim-type image scanner is a portable scanner developed recently, which can be made very thin and is fashionable in appearance. Because of its excellent portability, the slim-type image scanner can be carried around by users. Such a scanner is not only suitable for scanning a label on paper, but also suitable for scanning a label on a screen of an electronic device, such as a laptop computer, a tablet computer, a notebook, a netbook or a smartphone. Particularly, with the rapid development of mobile communication technologies, using the slim-type image scanner to scan a barcode on a smart phone screen has become a technique commonly used by users, and is widely used in applications such as microblog and Wechat.

A traditional scanner has an imager and an illumination component, and when a barcode to be scanned is placed in front of the imager, the illumination component provides illumination needed by an imager barcode scanner, and the illuminated barcode can reflect the light emitted by the illumination component for the imager to perform receiving and decoding. Although such illumination enables the barcode to reflect light with sufficient intensity, when the barcode is on the screen of an electronic device (such as a cell phone), the case where brightness is too high will occur in the field of view of the imager because of specular reflection, i.e., a bright spot being produced in a barcode region, causing decoding failure.

During specular reflection, the light is reflected from a single incident direction to a single emitting direction, and the light intensity may be too strong, which is unfavorable for the imager when performing receiving and decoding. Diffusively reflected light is reflected at many angles, rather than only reflecting at a single angle like specular reflection. In general, the reflection of a barcode on paper is diffusive reflection, so that the imager can obtain an image signal with appropriate intensity for decoding. However, the reflection of the barcode on a screen of an electronic device, such as a cell phone, is specular reflection, and thus the imager will capture an unexpected specular reflection image, thereby being unable to correctly decode the image of the barcode.

Therefore, there is a need for a scanner that can effectively avoid such a situation of specular reflection.

SUMMARY

The present invention embraces a scanner with an illumination system, wherein a plurality of illumination devices are provided in the illumination system, and the occurrence of a specular reflection problem is avoided by controlling the illumination methods of the plurality of illumination devices.

According to an exemplary embodiment, the present disclosure provides a scanner with an illumination system, including: a plurality of illumination devices in the illumination system, wherein the plurality of illumination devices illuminate a label; an imager, which captures an image signal reflected from the label and decodes the image signal; and a detector, which detects the intensity of light reflected from the label, wherein if the light intensity is higher than a predetermined threshold, an illumination status of one or more of the plurality of illumination devices is changed.

In another exemplary embodiment, changing the illumination status of one or more of the plurality of illumination devices closes one or more of the plurality of illumination devices.

In yet another exemplary embodiment, changing the illumination status of one or more of the plurality of illumination devices opens one illumination device once in the plurality of illumination devices and successively opens the same.

In yet another exemplary embodiment, changing the illumination status of one or more of the plurality of illumination devices opens multiple illumination devices once in the plurality of illumination devices and successively opens same in a predetermined pattern.

In yet another exemplary embodiment, changing the illumination status of one or more of the plurality of illumination devices opens multiple of the plurality of illumination devices once at a predetermined interval and successively opens same.

In yet another exemplary embodiment, the imager includes a wide-angle lens.

In yet another exemplary embodiment, the plurality of illumination devices is uniformly distributed on an edge of the scanner.

An exemplary beneficial effect of the present disclosure is that the scanner effectively avoids specular reflection when scanning a barcode on a smartphone screen.

BRIEF DESCRIPTION OF THE DRAWINGS

The present disclosure will be described below in conjunction with the following drawings. In each figure, similar reference numerals represent similar elements, and in the accompany drawings.

DETAILED DESCRIPTION

In the following detailed description, the embodiments are described in sufficient detail so that a person skilled in the art can carry out the present disclosure. It should be understood that other embodiments can be used without departing from the scope of the present disclosure. Therefore, the following description should not be considered in a limiting sense.

The following detailed description is merely illustrative in essence, and is not intended to limit embodiments and the use of these embodiments. As used herein, the word "exemplary" means "serving as an example, instance, or illustration". Any embodiment described herein as "exemplary" is not necessarily to be construed as preferred or advantageous over other embodiments. In addition, it does not mean being confined by any explicit or implicit theory proposed in the foregoing technical field, background, summary, or the following detailed description.

Figure 1:
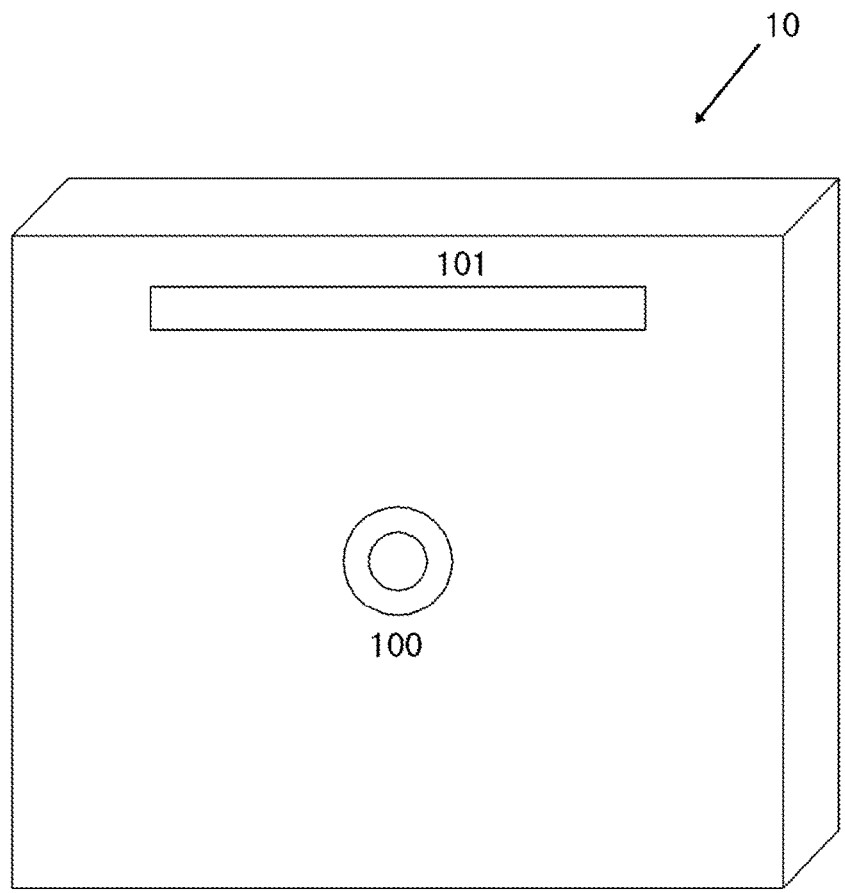
FIG. 1 shows a schematic diagram of a traditional scanner according to the related art.

A traditional scanner is shown as FIG. 1. A scanner 10 may have an imager 100 and an illumination component 101, and the scanner 10 can be used for scanning a label, such as a barcode. When the barcode to be scanned is placed in front of the scanner 10, the illumination component 101 illuminates the barcode. The illuminated barcode can reflect the light irradiated by the illumination component for the imager 100 to perform receiving and decoding. Such illumination of the illumination component enables the barcode to reflect light with sufficient intensity, but in the case of a barcode on a smartphone screen, the barcode also typically causes the situation of excessive brightness (for example, a piece of floral white) to occur in the field of view of the imager 100. Thus, the imager 100 will capture an unexpected specular reflection image, thereby being unable to correctly decode the image of the barcode.

In order to solve such a specular reflection problem, an illumination component operating in a different mode is used in the scanner of the present disclosure. The scanner of the present disclosure is provided with a plurality of illumination components and avoids the occurrence of the specular reflection problem by controlling the illumination methods of the plurality of illumination components.

Referring to FIGS. 2A-2D, which show a scanner 20 according to an exemplary embodiment of the present disclosure. The scanner 20 may be a slim-type barcode scanner based on a wide-angle lens imager. The scanner 20 may comprise an imager 200 and illumination devices (for example, illumination bars) 201-204, wherein in order to facilitate illustration, only four illumination devices are shown. It should be understood that the number of the illumination devices may not be limited to four. The illumination devices 201-204 may be arranged on an edge of each direction of the scanner 20, may be arranged uniformly, for example, being arranged in tetragonal N regular polygon, and may be far away from the imager 200 so as not to interfere with receiving an image signal thereby in illumination. In general, the imager 200 may be located at the center of the scanner 20. Alternatively, the scanner 20 may comprise a detector (not shown), which detects whether the intensity of light received from a label (taking a barcode as an example hereinafter) is higher than a predetermined threshold, i.e., judging whether specular reflection will occur.

When a barcode on a common paper material is scanned, and when the barcode is placed in front of the scanner 20, these illumination devices are generally opened. For example, when the detector detects the barcode, as shown in FIG. 2A, the illumination device 201 is opened, while the illumination devices 202-204 are closed; in an alternative embodiment, the illumination devices 201-204 can be opened simultaneously, or partially opened; and when there is a need to scan a barcode on a phone screen or other materials that can produce specular reflection, the detector will detect whether the intensity of light reflected from the barcode is higher than a predetermined threshold, i.e., whether specular reflection will occur, and if specular reflection occurs, an illumination status of the illumination device is changed, for example, when an illumination device is initially opened, closing the illumination device, or closing one or more of the illumination devices that are all initially opened, or controlling the illumination devices to successively open cyclic illumination.

Figure 2A:
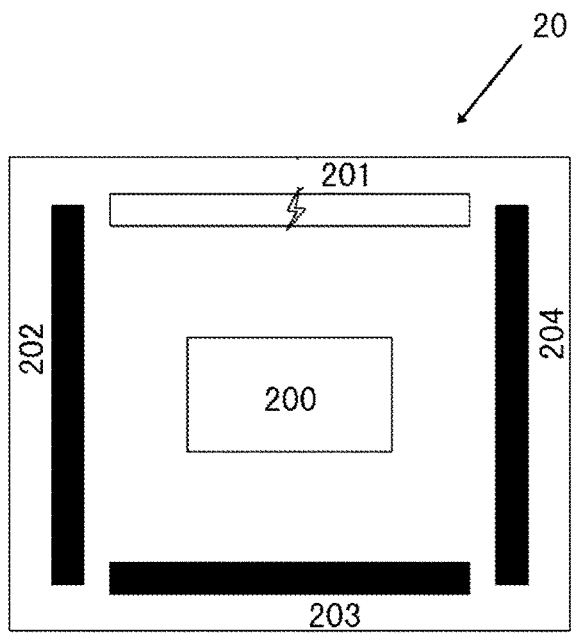
FIGS. 2A-2D show a scanner according to an exemplary embodiment of the present disclosure.
Figure 2B:
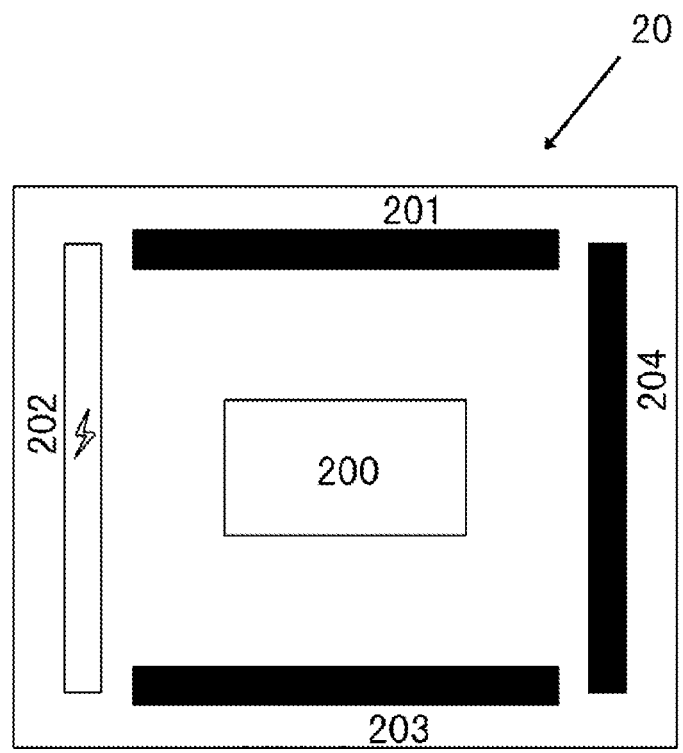
Figure 2C:
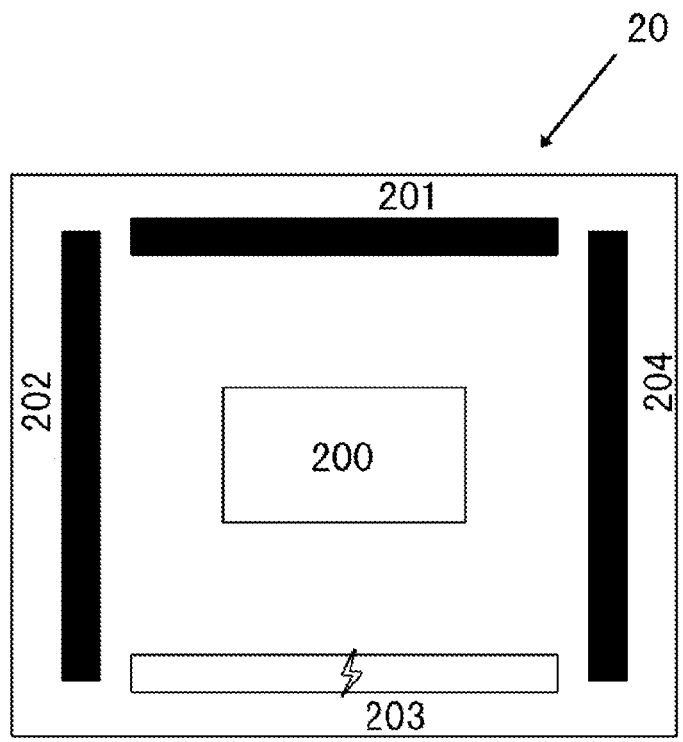
Figure 2D:
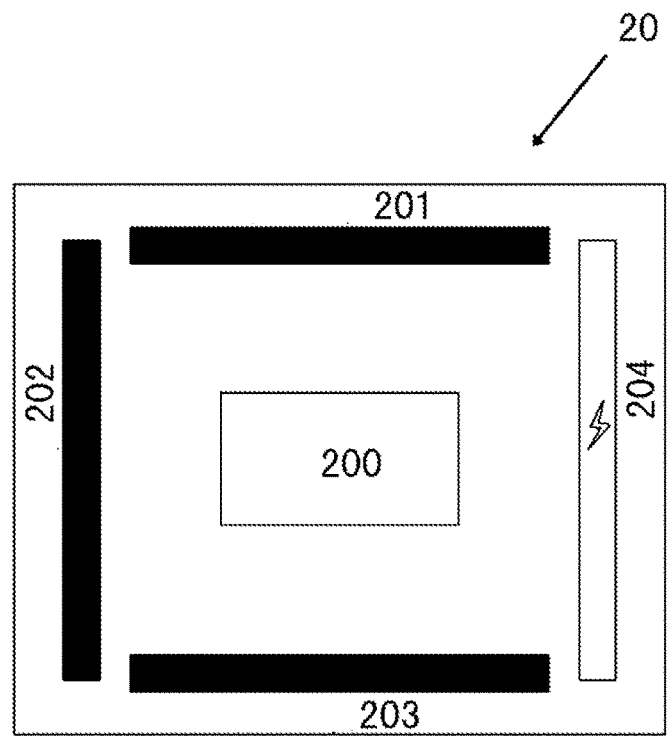

FIG. 2A is taken as an example, and when paper scanning is performed, the illumination device 201 is opened, while the illumination devices 202-204 are closed; and at this time, if specular reflection is detected when the barcode on the specular reflection material is scanned, the illumination device 201 can be directly closed. Or, as shown in FIGS. 2A to 2D, controlling the illumination devices 201-204 to successively open illumination is described in detail as follows: at the beginning, only opening the illumination device 201, while closing the illumination devices 202-204;

after a predetermined time t (such as 0.01 second, 0.05 second), as shown in FIG. 2B, opening the illumination device 202, while closing the illumination devices 201, 203 and 204; and after a predetermined time again, as shown in FIG. 2C, opening the illumination device 203, while closing the illumination devices 201, 202 and 204;

and so on, as shown in FIG. 2D, opening the illumination device 204, while closing the illumination devices 201-203.

Next, the illumination device 201 is opened again, while the illumination devices 202-204 are closed, and the cycle repeats in this way until information about the barcode is completely obtained by the imager 200.

Insofar as only one of the illumination devices 201-204 of the scanner 20 is opened once as stated above and they are all opened successively, it is possible to prevent the imager 200 from failing to appropriately perform receiving and decoding because of excessive illumination of specular reflection.

In the present embodiment, it may be that one illumination device is successively opened once, and it should be understood that it may also be that two or more of the illumination devices are opened successively.

Referring to FIGS. 3A-3D, which show a scanner 30 according to another exemplary embodiment of the present disclosure. The scanner 30 may also be a slim-type barcode scanner based on a wide-angle lens imager. The scanner 30 may comprise an imager 300 and illumination devices (for example, illumination bars) 301-304, wherein in order to facilitate illustration, only four illumination devices are shown. It should be understood that the number of the illumination devices may not be limited to four. The illumination devices 301-304 may be arranged on an edge of each direction of the scanner 30, may be arranged uniformly, and may be far away from the imager 300 so as not to interfere with receiving an image signal thereby in illumination. In general, the imager 300 may be located at the center of the scanner 30. Alternatively, the scanner 30 may further comprise a detector (not shown), which detects whether the intensity of light received from a barcode is higher than a predetermined threshold.

Figure 3A:
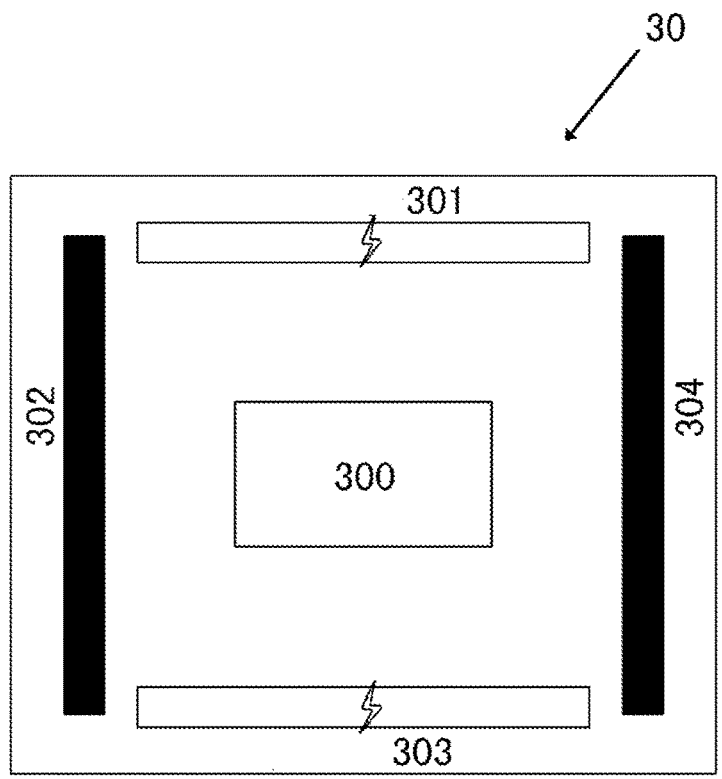
FIGS. 3A-3D show a scanner according to another exemplary embodiment of the present disclosure.
Figure 3B:
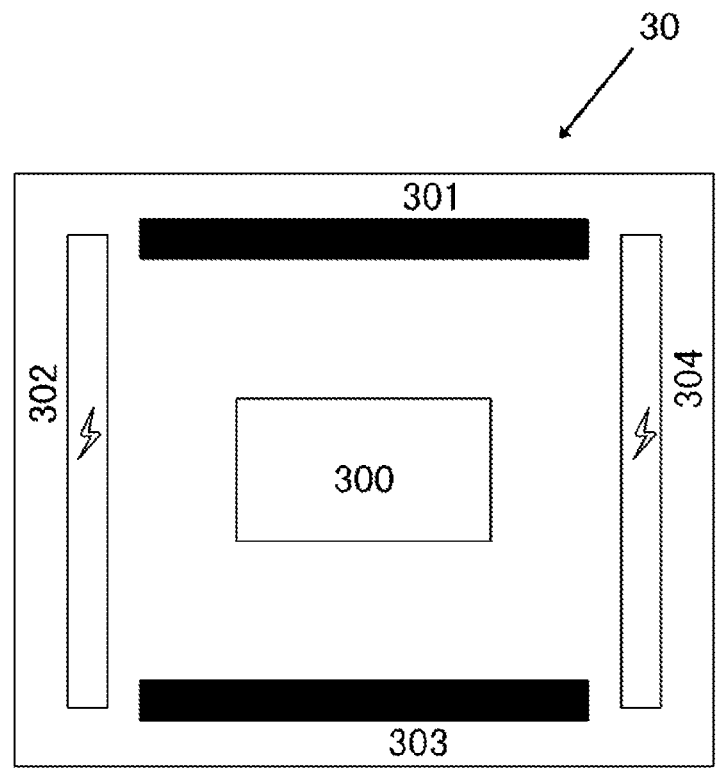
Figure 3C:
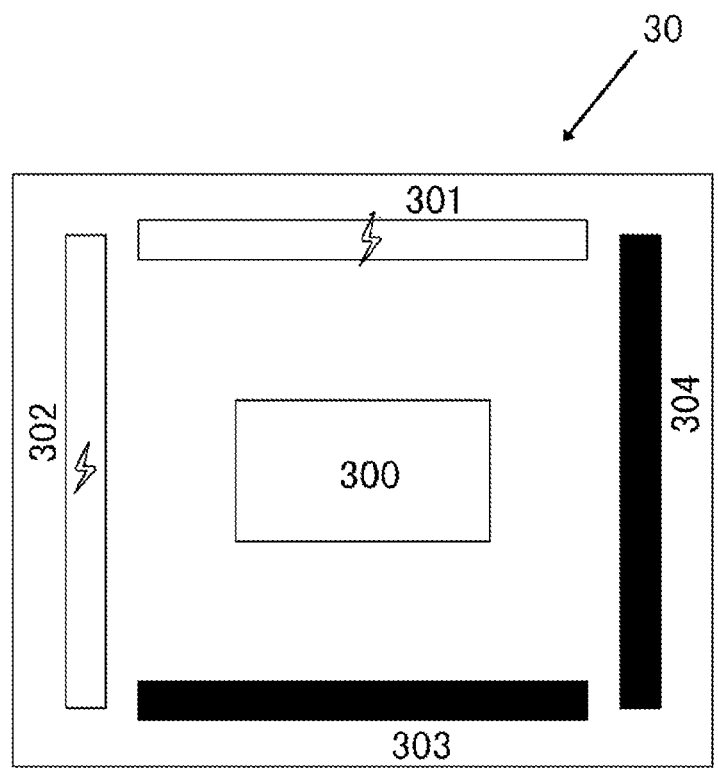
Figure 3D:
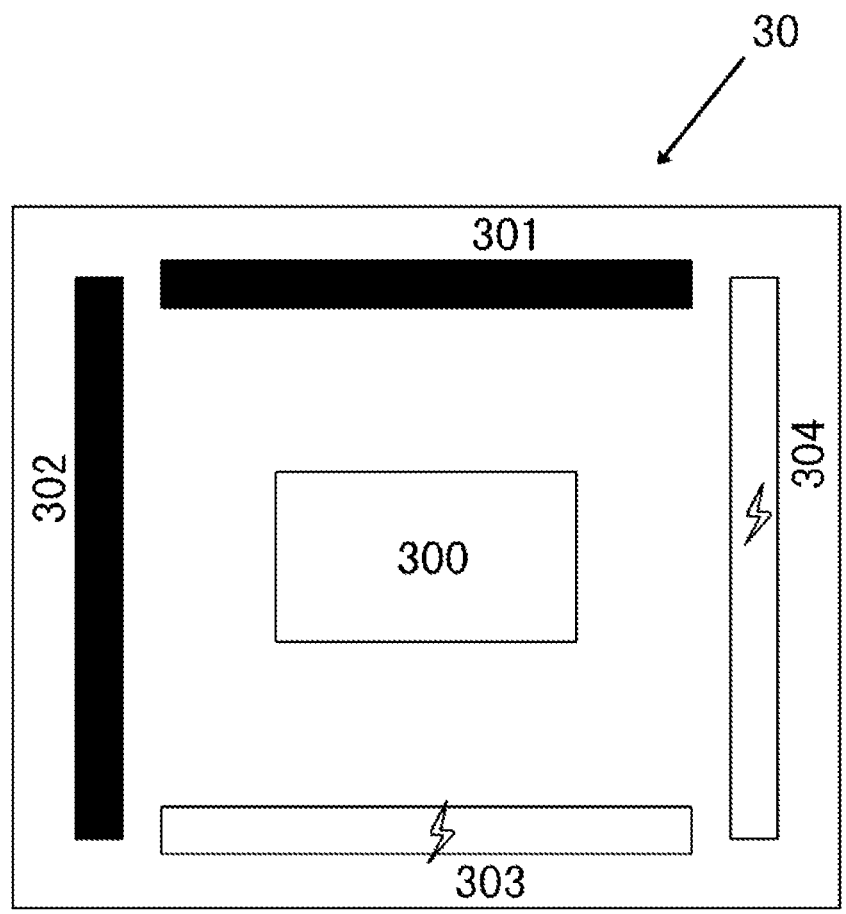

FIG. 3A is taken as an example, and when paper scanning is performed, the illumination devices 301 and 303 are opened, while the illumination devices 302 and 304 are closed; at this time, if there is a need to scan a barcode on a specular reflection material, when the detector determines that the intensity of light reflected from the barcode is higher than the predetermined threshold, the illumination devices 301 and 303 can be directly completely closed or one of them is closed; or as shown in FIG. 3B, the illumination devices 301 and 303 are closed, while the additional illumination devices 302 and 304 are opened; or as shown in FIG. 3C, the illumination device 303 is closed, while the illumination device 302 is opened; or as shown in 3D, the illumination device 301 is closed, while the illumination device 304 is opened; specifically as follows:

as shown in FIG. 3A, at the beginning, opening the illumination devices 301 and 303, while closing the illumination devices 302 and 304, and when the detector determines that the intensity of light reflected from the barcode is higher than the predetermined threshold, after a predetermined time t' (such as 0.01 second, 0.05 second), as shown in FIG. 3B, opening the illumination devices 302 and 304, while closing the illumination devices 301 and 303;

then as shown in FIG. 3C, opening the illumination devices 301 and 302, while closing the illumination devices 303 and 304;

and so on, finally, as shown in FIG. 3D, opening the illumination devices 303 and 304, while closing the illumination devices 301 and 302.

Next, the step of opening the illumination devices 301 and 303 while closing the illumination devices 302 and 304 is repeated, and the cycle repeats in this way until information about the barcode is completely obtained by the imager 300.

In the above-mentioned embodiment, it may be that the illumination devices are grouped in pairs to control different groups of illumination devices to emit light for performing a decoding attempt, and it should be understood that it may also be that three illumination devices are grouped into one group, and then different groups of illumination devices are controlled to provide different illumination methods for performing the decoding attempt.

In addition, if there are a greater number of illumination devices, a certain number of illumination devices can be directly opened once at a predetermined interval, for example, opening one at each moment every two or more illumination devices and so on as described above, or can successively open a certain number of illumination devices in a predetermined pattern.

The illumination devices (such as 301-304 shown) of the scanner 30 operate in this way, enabling the illumination method of irradiating on the barcode to constantly change, so that the position where reflection happens changes continuously, in which the successful decoding attempts can be performed.

In addition, as shown in FIGS. 2A-2D and FIGS. 3A-3D, a scanner 20 and a scanner 30 may be in a rectangular shape, but they are not limited to such a shape, and may further have any shapes that can be made relatively thin and fixed on a table board.

To supplement the present disclosure, this application incorporates entirely by reference the following patents, patent application publications, and patent applications:
U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. D702,237; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963; U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426; U.S. Pat. No. 8,881,983; U.S. Pat. No. 8,881,987; U.S. Pat. No. 8,903,172; U.S. Pat. No. 8,908,995; U.S. Pat. No. 8,910,870; U.S. Pat. No. 8,910,875; U.S. Pat. No. 8,914,290; U.S. Pat. No. 8,914,788; U.S. Pat. No. 8,915,439; U.S. Pat.

No. 8,915,444; U.S. Pat. No. 8,916,789; U.S. Pat. No. 8,918,250; U.S. Pat. No. 8,918,564; U.S. Pat. No. 8,925,818; U.S. Pat. No. 8,939,374; U.S. Pat. No. 8,942,480; U.S. Pat. No. 8,944,313; U.S. Pat. No. 8,944,327; U.S. Pat. No. 8,944,332; U.S. Pat. No. 8,950,678; U.S. Pat. No. 8,967,468; U.S. Pat. No. 8,971,346; U.S. Pat. No. 8,976,030; U.S. Pat. No. 8,976,368; U.S. Pat. No. 8,978,981; U.S. Pat. No. 8,978,983; U.S. Pat. No. 8,978,984; U.S. Pat. No. 8,985,456; U.S. Pat. No. 8,985,457; U.S. Pat. No. 8,985,459; U.S. Pat. No. 8,985,461; U.S. Pat. No. 8,988,578; U.S. Pat. No. 8,988,590; U.S. Pat. No. 8,991,704; U.S. Pat. No. 8,996,194; U.S. Pat. No. 8,996,384; U.S. Pat. No. 9,002,641; U.S. Pat. No. 9,007,368; U.S. Pat. No. 9,010,641; U.S. Pat. No. 9,015,513; U.S. Pat. No. 9,016,576; U.S. Pat. No. 9,022,288; U.S. Pat. No. 9,030,964; U.S. Pat. No. 9,033,240; U.S. Pat. No. 9,033,242; U.S. Pat. No. 9,036,054; U.S. Pat. No. 9,037,344; U.S. Pat. No. 9,038,911; U.S. Pat. No. 9,038,915; U.S. Pat. No. 9,047,098; U.S. Pat. No. 9,047,359; U.S. Pat. No. 9,047,420; U.S. Pat. No. 9,047,525; U.S. Pat. No. 9,047,531; U.S. Pat. No. 9,053,055; U.S. Pat. No. 9,053,378; U.S. Pat. No. 9,053,380; U.S. Pat. No. 9,058,526; U.S. Pat. No. 9,064,165; U.S. Pat. No. 9,064,167; U.S. Pat. No. 9,064,168; U.S. Pat. No. 9,064,254; U.S. Pat. No. 9,066,032; U.S. Pat. No. 9,070,032; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D733,112; U.S. Design Pat. No. D734,339; International Publication No. 2013/163789; International Publication No. 2013/173985; International Publication No. 2014/019130; International Publication No. 2014/110495; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0287258; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0313325; U.S. Patent Application Publication No. 2013/0342717; U.S. Patent Application Publication No. 2014/0001267; U.S. Patent Application Publication No. 2014/0008439; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0042814; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0078341; U.S. Patent Application Publication No. 2014/0078345; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0104451; U.S. Patent Application Publication No. 2014/0106594; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0114530; U.S. Patent Application Publication No. 2014/0124577; U.S. Patent Application Publication No. 2014/0124579; U.S. Patent Application Publication No. 2014/0125842; U.S. Patent Application Publication No. 2014/0125853; U.S. Patent Application Publication No. 2014/0125999; U.S. Patent Application Publication No. 2014/0129378; U.S. Patent Application Publication No. 2014/0131438; U.S. Patent Application Publication No. 2014/0131441; U.S. Patent Application Publication No. 2014/0131443; U.S. Patent Application Publication No. 2014/0131444; U.S. Patent Application Publication No. 2014/0131445; U.S. Patent Application Publication No. 2014/0131448; U.S. Patent Application Publication No. 2014/0133379; U.S. Patent Application Publication No. 2014/0136208; U.S. Patent Application Publication No. 2014/0140585; U.S. Patent Application Publication No. 2014/0151453; U.S. Patent Application Publication No. 2014/0152882; U.S. Patent Application Publication No. 2014/0158770; U.S. Patent Application Publication No. 2014/0159869; U.S. Patent Application Publication No. 2014/0166755; U.S. Patent Application Publication No. 2014/0166759; U.S. Patent Application Publication No. 2014/0168787; U.S. Patent Application Publication No. 2014/0175165; U.S. Patent Application Publication No. 2014/0175172; U.S. Patent Application Publication No. 2014/0191644; U.S. Patent Application Publication No. 2014/0191913; U.S. Patent Application Publication No. 2014/0197238; U.S. Patent Application Publication No. 2014/0197239; U.S. Patent Application Publication No. 2014/0197304; U.S. Patent Application Publication No. 2014/0214631; U.S. Patent Application Publication No. 2014/0217166; U.S. Patent Application Publication No. 2014/0217180; U.S. Patent Application Publication No. 2014/0231500; U.S. Patent Application Publication No. 2014/0232930; U.S. Patent Application Publication No. 2014/0247315; U.S. Patent Application Publication No. 2014/0263493; U.S. Patent Application
Publication No. 2014/0263645; U.S. Patent Application
Publication No. 2014/0267609; U.S. Patent Application
Publication No. 2014/0270196; U.S. Patent Application
Publication No. 2014/0270229; U.S. Patent Application
Publication No. 2014/0278387; U.S. Patent Application
Publication No. 2014/0278391; U.S. Patent Application
Publication No. 2014/0282210; U.S. Patent Application
Publication No. 2014/0284384; U.S. Patent Application
Publication No. 2014/0288933; U.S. Patent Application
Publication No. 2014/0297058; U.S. Patent Application
Publication No. 2014/0299665; U.S. Patent Application
Publication No. 2014/0312121; U.S. Patent Application
Publication No. 2014/0319220; U.S. Patent Application
Publication No. 2014/0319221; U.S. Patent Application
Publication No. 2014/0326787; U.S. Patent Application
Publication No. 2014/0332590; U.S. Patent Application
Publication No. 2014/0344943; U.S. Patent Application
Publication No. 2014/0346233; U.S. Patent Application
Publication No. 2014/0351317; U.S. Patent Application
Publication No. 2014/0353373; U.S. Patent Application
Publication No. 2014/0361073; U.S. Patent Application
Publication No. 2014/0361082; U.S. Patent Application
Publication No. 2014/0362184; U.S. Patent Application
Publication No. 2014/0363015; U.S. Patent Application
Publication No. 2014/0369511; U.S. Patent Application
Publication No. 2014/0374483; U.S. Patent Application
Publication No. 2014/0374485; U.S. Patent Application
Publication No. 2015/0001301; U.S. Patent Application
Publication No. 2015/0001304; U.S. Patent Application
Publication No. 2015/0003673; U.S. Patent Application
Publication No. 2015/0009338; U.S. Patent Application
Publication No. 2015/0009610; U.S. Patent Application
Publication No. 2015/0014416; U.S. Patent Application
Publication No. 2015/0021397; U.S. Patent Application
Publication No. 2015/0028102; U.S. Patent Application
Publication No. 2015/0028103; U.S. Patent Application
Publication No. 2015/0028104; U.S. Patent Application
Publication No. 2015/0029002; U.S. Patent Application
Publication No. 2015/0032709; U.S. Patent Application
Publication No. 2015/0039309; U.S. Patent Application
Publication No. 2015/0039878; U.S. Patent Application
Publication No. 2015/0040378; U.S. Patent Application
Publication No. 2015/0048168; U.S. Patent Application
Publication No. 2015/0049347; U.S. Patent Application
Publication No. 2015/0051992; U.S. Patent Application
Publication No. 2015/0053766; U.S. Patent Application
Publication No. 2015/0053768; U.S. Patent Application
Publication No. 2015/0053769; U.S. Patent Application
Publication No. 2015/0060544; U.S. Patent Application
Publication No. 2015/0062366; U.S. Patent Application
Publication No. 2015/0063215; U.S. Patent Application
Publication No. 2015/0063676; U.S. Patent Application
Publication No. 2015/0069130; U.S. Patent Application
Publication No. 2015/0071819; U.S. Patent Application
Publication No. 2015/0083800; U.S. Patent Application
Publication No. 2015/0086114; U.S. Patent Application
Publication No. 2015/0088522; U.S. Patent Application
Publication No. 2015/0096872; U.S. Patent Application
Publication No. 2015/0099557; U.S. Patent Application
Publication No. 2015/0100196; U.S. Patent Application
Publication No. 2015/0102109; U.S. Patent Application
Publication No. 2015/0115035; U.S. Patent Application
Publication No. 2015/0127791; U.S. Patent Application
Publication No. 2015/0128116; U.S. Patent Application
Publication No. 2015/0129659; U.S. Patent Application
Publication No. 2015/0133047; U.S. Patent Application
Publication No. 2015/0134470; U.S. Patent Application
Publication No. 2015/0136851; U.S. Patent Application
Publication No. 2015/0136854; U.S. Patent Application
Publication No. 2015/0142492; U.S. Patent Application
Publication No. 2015/0144692; U.S. Patent Application
Publication No. 2015/0144698; U.S. Patent Application
Publication No. 2015/0144701; U.S. Patent Application
Publication No. 2015/0149946; U.S. Patent Application
Publication No. 2015/0161429; U.S. Patent Application
Publication No. 2015/0169925; U.S. Patent Application
Publication No. 2015/0169929; U.S. Patent Application
Publication No. 2015/0178523; U.S. Patent Application
Publication No. 2015/0178534; U.S. Patent Application
Publication No. 2015/0178535; U.S. Patent Application
Publication No. 2015/0178536; U.S. Patent Application
Publication No. 2015/0178537; U.S. Patent Application
Publication No. 2015/0181093; U.S. Patent Application
Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Although at least one exemplary embodiment has been presented in the foregoing particular embodiments of the subject matter of the present disclosure, it should be understood that there exist a large number of variations. It should also be understood that the one or more exemplary embodiments are merely examples, and are not intended to limit the scope, applicability, or configuration of the subject matter of the present disclosure in any way. More specifically, the foregoing particular embodiments will provide a person skilled in the art with a convenient map for realizing the exemplary embodiments of the subject matter of the present disclosure. It should be understood that various changes can be made in terms of the functions and distributions of the elements described in the exemplary embodiments, without departing from the scope of the subject matter of the present disclosure as set forth in the appended claims.

The invention claimed is:

1. A scanner, comprising:
a plurality of illumination devices configured to illuminate a label;
an imager configured to capture light received from the label and generate an image signal; and
a detector configured to detect an intensity of light received from the label;
wherein the scanner is configured to, if the light intensity is higher than a predetermined threshold, change an illumination status of one or more of the plurality of illumination devices;
wherein the change in the illumination status comprises closing all of the one or more of the plurality of illumination devices that are initially opened.

2. The scanner of claim 1, wherein changing the illumination status of one or more of the plurality of illumination devices closes one or more of the plurality of illumination devices.

3. The scanner of claim 1, wherein changing the illumination status of one or more of the plurality of illumination devices opens one illumination device once in the plurality of illumination devices and successively opens the same illumination device.

4. The scanner of claim 1, wherein changing the illumination status of one or more of the plurality of illumination devices opens multiple illumination devices once in the plurality of illumination devices and successively opens the same illumination devices in a predetermined pattern.

5. The scanner of claim 1, wherein changing the illumination status of one or more of the plurality of illumination devices opens multiple of the plurality of illumination devices once at a predetermined interval and successively opens the same illumination devices.

6. The scanner of claim 1, wherein the imager comprises a wide-angle lens.

7. The scanner of claim 1, wherein the plurality of illumination devices are uniformly distributed on an edge of the scanner.

8. The scanner of claim 1, wherein the plurality of illumination devices are illumination bars.

9. The scanner of claim 1, wherein the scanner is configured to decode a barcode on the label.

10. The scanner of claim 1, wherein the label is located on a specular surface.

11. A method, comprising:
illuminating, with one or more illumination devices, a label, the one or more illumination devices being of a plurality of illumination devices of a scanner;
capturing, with an imager of the scanner, light received from the label;
detecting, with the scanner, an intensity of light received from the label; and
if the detected intensity of light is higher than a predetermined threshold, changing an illumination status of one or more of the plurality of illumination devices;
wherein the change in the illumination status comprises closing all of the one or more of the plurality of illumination devices that are initially opened.

12. The method of claim 11, wherein changing the illumination status of one or more of the plurality of illumination devices closes one or more of the plurality of illumination devices.

13. The method of claim 11, wherein changing the illumination status of one or more of the plurality of illumination devices opens one illumination device once in the plurality of illumination devices and successively opens the same illumination device.

14. The method of claim 11, wherein changing the illumination status of one or more of the plurality of illumination devices opens multiple illumination devices once in the plurality of illumination devices and successively opens the same illumination devices in a predetermined pattern.

15. The method of claim 11, wherein changing the illumination status of one or more of the plurality of illumination devices opens multiple of the plurality of illumination devices once at a predetermined interval and successively opens the same illumination devices.

16. The method of claim 11, wherein the imager comprises a wide-angle lens.

17. The method of claim 11, wherein the plurality of illumination devices are uniformly distributed on an edge of the scanner.

18. The method of claim 11, wherein the plurality of illumination devices are illumination bars.

19. The method of claim 11, comprising decoding a barcode on the label.

20. The method of claim 11, wherein the label is displayed on an electronic screen.

* * * * *